(12) United States Patent
Mantor et al.

(10) Patent No.: US 10,169,906 B2
(45) Date of Patent: Jan. 1, 2019

(54) HYBRID RENDER WITH DEFERRED PRIMITIVE BATCH BINNING

(71) Applicants: Advanced Micro Devices, Inc., Sunnyvale, CA (US); ATI Technologies ULC, Markham (CA)

(72) Inventors: Michael Mantor, Orlando, FL (US); Laurent Lefebvre, Mascouche (CA); Mark Fowler, Hopkinton, MA (US); Timothy Kelley, Orlando, FL (US); Mikko Alho, Kokemäki (FI); Mika Tuomi, Noormarkku (FI); Kiia Kallio, Inkoo As (FI); Patrick Klas Rudolf Buss, Helsinki (FI); Jari Antero Komppa, Karjaa (FI); Kaj Tuomi, Noormarkku (FI)

(73) Assignees: Advanced Micro Devices, Inc., Sunnyvale, CA (US); ATI Technologies ULC, Markham, Ontario (CA)

( * ) Notice: Subject to any disclaimer, the term of this patent is extended or adjusted under 35 U.S.C. 154(b) by 350 days.

(21) Appl. No.: 13/853,422

(22) Filed: Mar. 29, 2013

(65) Prior Publication Data

US 2014/0292756 A1 Oct. 2, 2014

(51) Int. Cl.
*G06T 1/20* (2006.01)
*G06T 15/00* (2011.01)

(52) U.S. Cl.
CPC .................. *G06T 15/005* (2013.01)

(58) Field of Classification Search
CPC ....... G06T 15/506; G06T 15/005; G06T 1/20; G06T 15/80
USPC .................................................. 345/426, 522
See application file for complete search history.

(56) References Cited

U.S. PATENT DOCUMENTS

| | | | |
|---|---|---|---|
| 5,251,296 A | 10/1993 | Rhoden et al. | |
| 6,344,852 B1* | 2/2002 | Zhu et al. | 345/418 |
| 6,437,780 B1* | 8/2002 | Baltaretu et al. | 345/423 |
| 6,798,421 B2 | 9/2004 | Baldwin | |
| 7,170,515 B1 | 1/2007 | Zhu | |
| 7,224,364 B1 | 5/2007 | Yue et al. | |
| 2003/0058244 A1* | 3/2003 | Ramani | G06T 11/40 345/440 |
| 2004/0183807 A1* | 9/2004 | Emberling | G06T 15/04 345/552 |
| 2004/0196283 A1* | 10/2004 | Lewis et al. | 345/419 |
| 2007/0146378 A1 | 6/2007 | Sorgard et al. | |
| 2007/0165035 A1* | 7/2007 | Duluk et al. | 345/506 |
| 2007/0296725 A1 | 12/2007 | Steiner et al. | |
| 2008/0259076 A1* | 10/2008 | Meinds | 345/423 |
| 2010/0177105 A1* | 7/2010 | Nystad et al. | 345/522 |

(Continued)

*Primary Examiner* — Barry Drennan
*Assistant Examiner* — Terrell Robinson
(74) *Attorney, Agent, or Firm* — Volpe and Koenig, P.C.

(57) ABSTRACT

A system, method and a computer program product are provided for hybrid rendering with deferred primitive batch binning. A primitive batch is generated from a sequence of primitives. Initial bin intercepts are identified for primitives in the primitive batch. A bin for processing is identified. The bin corresponds to a region of a screen space. Pixels of the primitives intercepting the identified bin are processed. Next bin intercepts are identified while the primitives intercepting the identified bin are processed.

22 Claims, 8 Drawing Sheets

(56) References Cited

U.S. PATENT DOCUMENTS

2012/0280992 A1* 11/2012 Shebanow .............. G06T 11/40
　　　　　　　　　　　　　　　　　　　　345/420
2014/0118364 A1　　5/2014　Hakura et al.
2014/0229414 A1　　8/2014　Goldberg et al.

* cited by examiner

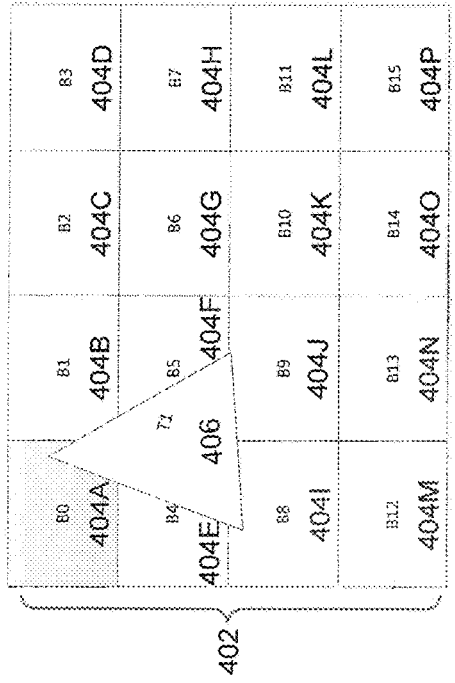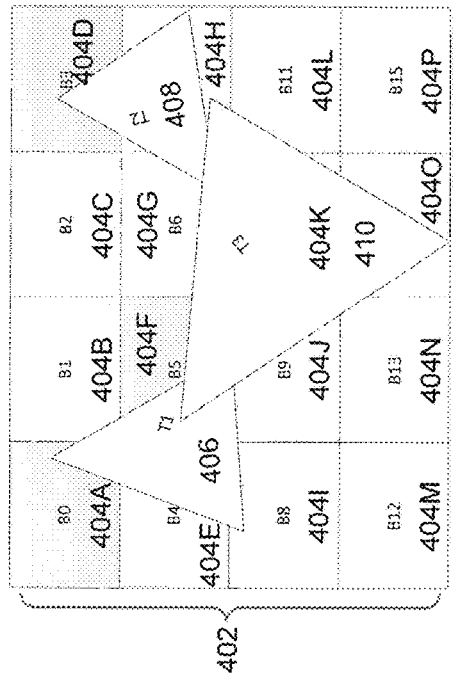
FIG. 4A  FIG. 4B
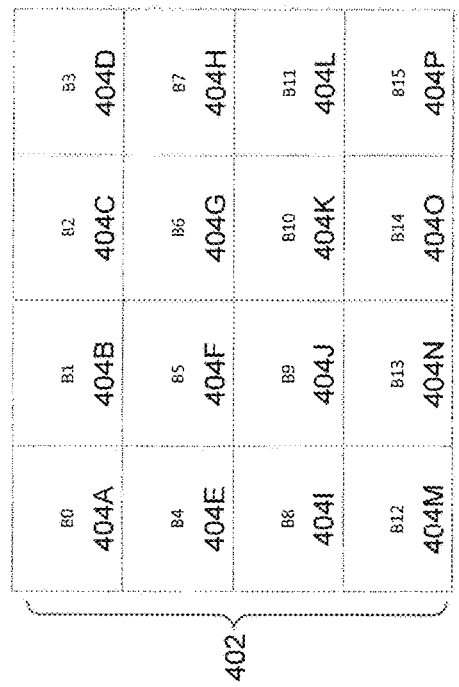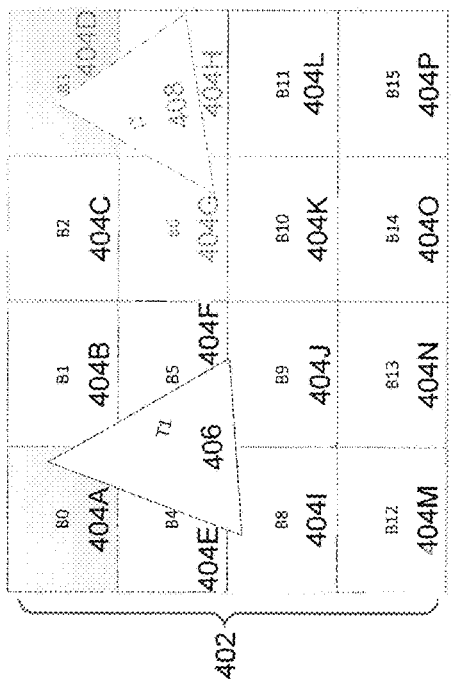
FIG. 4C  FIG. 4D

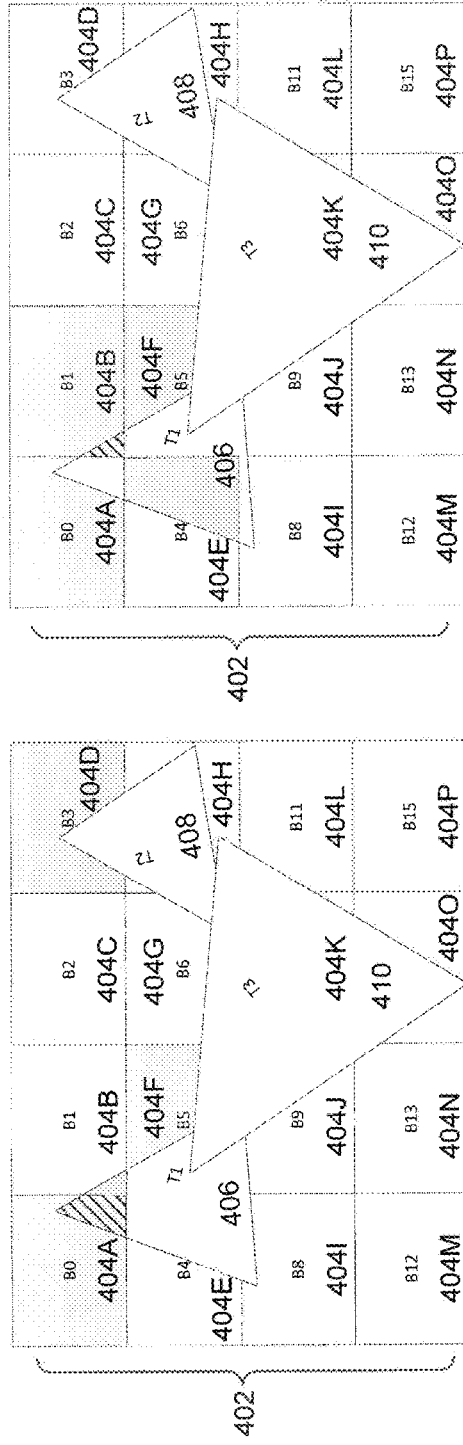
FIG. 4E
FIG. 4F
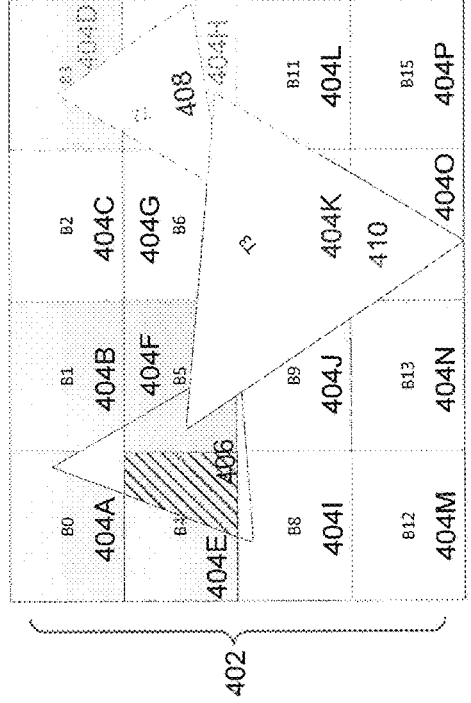
FIG. 4H
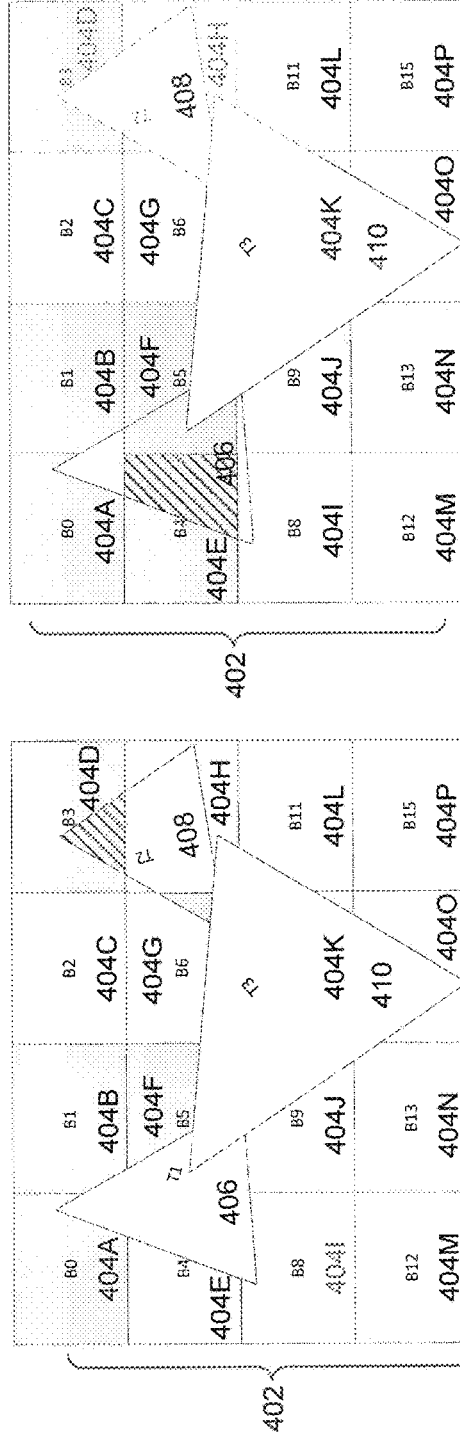
FIG. 4G

HYBRID RENDER WITH DEFERRED PRIMITIVE BATCH BINNING

BACKGROUND

Display images typically comprise millions of dots, where each dot represents one of thousands or millions of colors. These dots are known as picture elements, or "pixels". Each pixel has multiple attributes associated with it, such as, color, depth, translucency, or texture attributes. Those attributes are manipulated and processed before being rendered on a display screen of an electronic device.

Pixels are produced by rendering graphical objects in order to determine color values for respective pixels. Example graphical objects include points, lines, polygons, and three-dimensional (3D) higher order surfaces. Points, lines, and polygons represent rendering primitives which are the basis for most 3D rendering instructions. More complex structures, such as 3D objects, are formed from a combination or a mesh of such primitives. To display a particular scene, the primitives with potential contributing pixels associated with the scene are rendered individually by determining pixels that fall within the edges of the primitives, and obtaining the attributes of the primitives that correspond to each of those pixels.

Because there are often thousands, millions, or even hundred millions of primitives in a 3D scene, the complete rasterization of each primitive individually can result in less than optimal system performance while rendering complex 3D images on a display screen. Such conventional graphics systems suffer from repeated color and depth value reads and writes from memory as the rasterization process moves from one primitive to the next. Immediate shading of rasterized pixels can result in unnecessary processing overhead and overall inefficient use of system memory bandwidth.

BRIEF SUMMARY OF EMBODIMENTS

Embodiments are generally directed to processing in a graphics pipeline. More particularly, embodiments are directed to a deferred primitive batch binning mechanism for rendering graphics in a graphics pipeline.

A system, method and a computer program product are provided for rendering graphics with deferred primitive batch binning. A primitive batch is generated from a sequential sequence of primitives. A first bin intercept is identified for primitives as they arrive in the primitive batch. After a batch is closed, a first bin for processing is identified. The bin corresponds to a region of a screen space. Primitives intercepting the identified bin are processed. For each primitive intercepting the identified bin, a next bin intercept is identified and the pixels included in the primitive that are enclosed by the identified bin are sent for detailed rasterization. The process is repeated for any bins intersected by a primitive of the primitive batch. Further features and advantages of the disclosed embodiments, as well as the structure and operation of various embodiments, are described in detail below with reference to the accompanying drawings. It is noted that the disclosure is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present disclosure and, together with the description, further serve to explain the principles of the embodiments and to enable a person skilled in the pertinent art to make and use the embodiments. Various embodiments are described below with reference to the drawings, wherein like reference numerals are used to refer to like elements throughout.

FIGS. 4A-4I illustrate examples of a deferred primitive batch binning process, according to an embodiment.

Embodiments will be described with reference to the accompanying drawings. Generally, the drawing in which an element first appears is typically indicated by the leftmost digit(s) in the corresponding reference number.

DETAILED DESCRIPTION OF EMBODIMENTS

Figure 1:
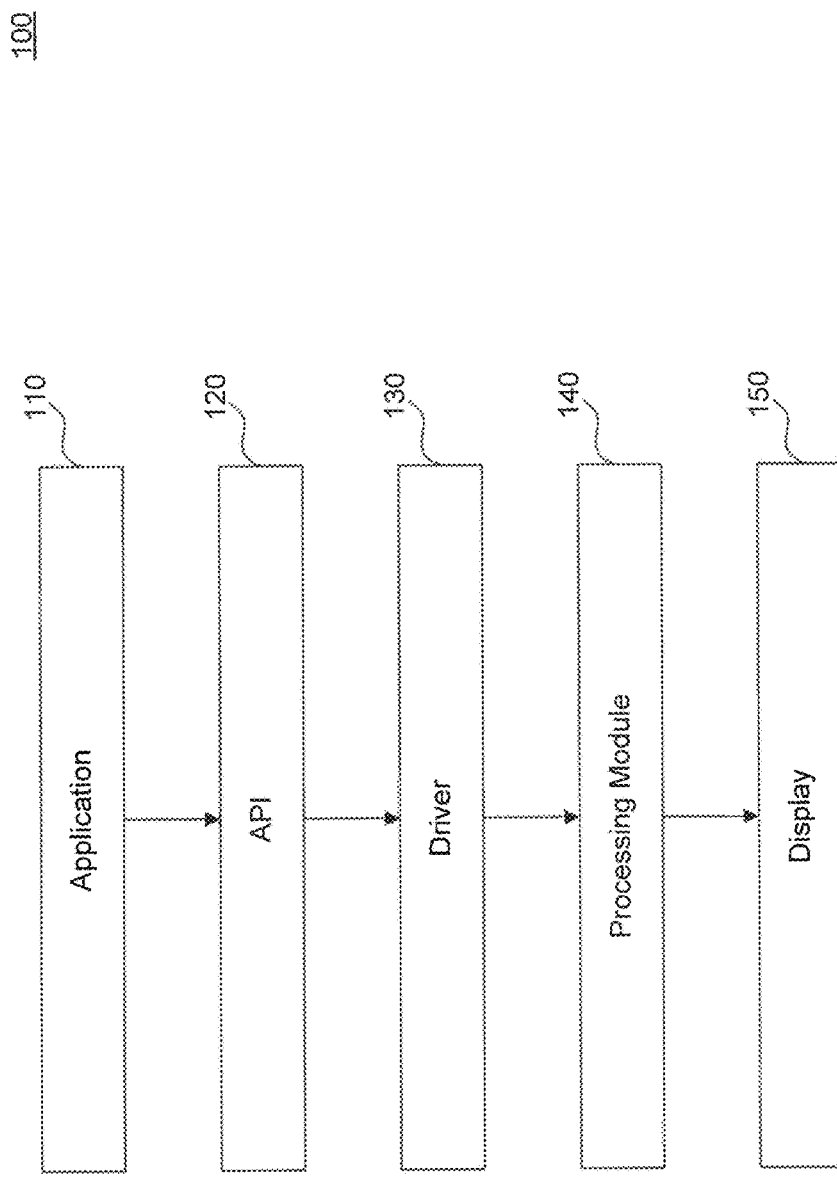
FIG. 1 is a block diagram of a graphics processing system, according to an embodiment.

In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "embodiments" does not require that all embodiments include the discussed feature, advantage or mode of operation. Alternate embodiments may be devised without departing from the scope of the disclosure, and well-known elements may not be described in detail or may be omitted so as not to obscure the relevant details. In addition, the terminology used herein is for the purpose of describing particular embodiments only and is not intended to be limiting. For example, as used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

To render and process data efficiently, graphics processing units (GPUs) include hardware pipelines. Hardware pipelines are dedicated to processing data of a particular type or perform a particular type of a function. A graphics pipeline is dedicated to process and render 3D computer graphics, images, video, etc. Each image or a frame is rendered using primitives that include points, lines, polygons or a combination of primitives that are organized into a mesh. The primitives in each frame or image are drawn individually by determining which pixels fall within the edges of the primitives and calculating the attributes of the primitive that corresponds to each of those pixels.

In conventional immediate mode rendering systems, a graphics processing pipeline is configured to render each primitive in a scene in the order the primitives were received by the pipeline. For example, a primitive can include a set of attributes such as x, y and z coordinates, color, or texture u, v coordinates corresponding to vertices of the primitive. Every forward facing primitive in a scene is then rasterized and shaded (the process of shading in contemporary GPU conducts user described operations to include interpolation, texturing, lighting and combining operations). Conventional immediate mode rendering graphics pipelines suffer from repeated color and depth value reads from memory as the rasterization process moves from one primitive to the next. For example, when the spatial separation of fragments associated with primitives on the screen exceeds the capacity of on chip color and depth read/write caches, repeated trips to system memory are required in order to process the primitives appropriately. This drawback in primitive processing significantly slows the rendering of an image in the graphics pipeline and is a bottleneck that affects efficient image rendering and increases the power required to obtain the final image on an electronic device.

FIG. 1 is an illustration of a graphics processing system 100 in which embodiments can be implemented. Graphics processing system 100 includes an application module 110, an application programming interface (API) 120, a driver module 130, a processing module 140 and a display module 150. Application module 110 can be an end-user application that requires graphics processing such as, for example and without limitation, a video game application. API 120 is configured to serve as an intermediary between application module 110 and driver module 130, according to an embodiment. In particular, API 120 can allow a wide range of common graphics functions to be written by software developers such that the graphics functions operate on many different hardware systems (e.g., processing module 140). Examples of API 120 include, but are not limited to, DirectX (from Microsoft) and OpenGL (from Silicon Graphics). Display module 150 can be, for example and without limitation, a cathode ray tube display, a liquid crystal display, a light emitting diode display, or other similar types of display devices.

Driver module 130 is a computer program that allows a higher-level graphics computing program, from application module 110, to interact with processing module 140, according to embodiments. For instance, driver module 130 can be written by a manufacturer of processing module 140 to translate standard code received from API 120 into a native format understood by processing unit of processing module 140. Driver module 130 allows input from, for example and without limitation, application module 110 or a user to direct settings of processing module 140. Such settings include selection of an anti-aliasing control, a texture filter control, a batch binning control, and deferred pixel shading control. For example, a user can select one or more of these settings via a user interface (UI), including a UI supplied to the user with graphics processing hardware and software.

Driver module 130 issues commands to processing module 140. In an embodiment, driver module 130 receives a graphics operation from application module 110 via API 120. The graphics operations can include, for example and without limitation, texture mapping of a graphics scene. As would be understood by a person skilled in the relevant art, during a texture mapping operation, a texture is used to add detail, surface texture, or color to the graphics scene.

In an embodiment, processing module 140 is configured to receive a sequence of primitives and opportunistically segment primitives into temporally related primitive batches. Sequential primitives are captured until a predetermined condition is met, such as batch full condition, state storage full condition, or a dependency on previously rendered primitives is determined, according to an embodiment. In one example, primitive batches are formed based on a predetermined maximum batch value. In another example, a collapsible batch binning technique may be used, where the maximum amount of initially collected primitives for a primitive batch is fixed, but during the processing of primitives of bins, completed primitives can be dismissed making it possible to dynamically insert new primitives during processing to form a flexible primitive batch.

A screen space which displays a rendered primitive may be divided into a number of blocks, such as, a checker board pattern. Each block of screen space may be associated with a bin. According to an embodiment a size of a bin is dynamic and can be configured to be any size based on processing conditions. Each primitive of the received sequence of primitives of a batch may intersect one or more bins. For each received primitive in a batch the initial bin intercept is computed, where an initial bin intercept is the upper-most left bin of the screen which the primitive intersects. After a batch is closed, a first bin for processing is identified. Primitives intercepting the identified bin are processed. For each primitive identified intercepting the bin, the next bin intercept is identified and the pixels included in the primitive that are enclosed by the identified bin are sent for detailed rasterization. The next bin intercept is the next upper-most left bin in raster order which the processed primitive intersects.

According to an embodiment, if a deferred shading operation is enabled, pixel shading is delayed. In an embodiment, processing module 140 accumulates fragments associated with primitives based on x, y screen coordinates. Primitives are rasterized into "pixel fragments". Processing module 140 is configured to perform tests on the fragments and perform filtering operations to determine which fragments will need to be shaded. In any given scene to be rendered, primitives may overlap or primitives may be transparent, for example. Thus, certain primitives and their corresponding fragments may not contribute to the final color or depth of a scene. Processing module 140 is configured to discard fragments which do not contribute to a final pixel color or pixel depth prior to performing any shading operation. The use of deferred primitive batch binning in an immediate mode rendering system is opportunistically employed and degrades to an immediate mode rendering system with small delay when a primitive batch size is based on one or more conditions forcing receipt of only one primitive per batch. Additionally the deferred primitive batch binning does is a completely embedded hardware process which results in reduced external bandwidth. The deferred batch binning processing mechanism will be discussed in greater detail below.

Figure 2:
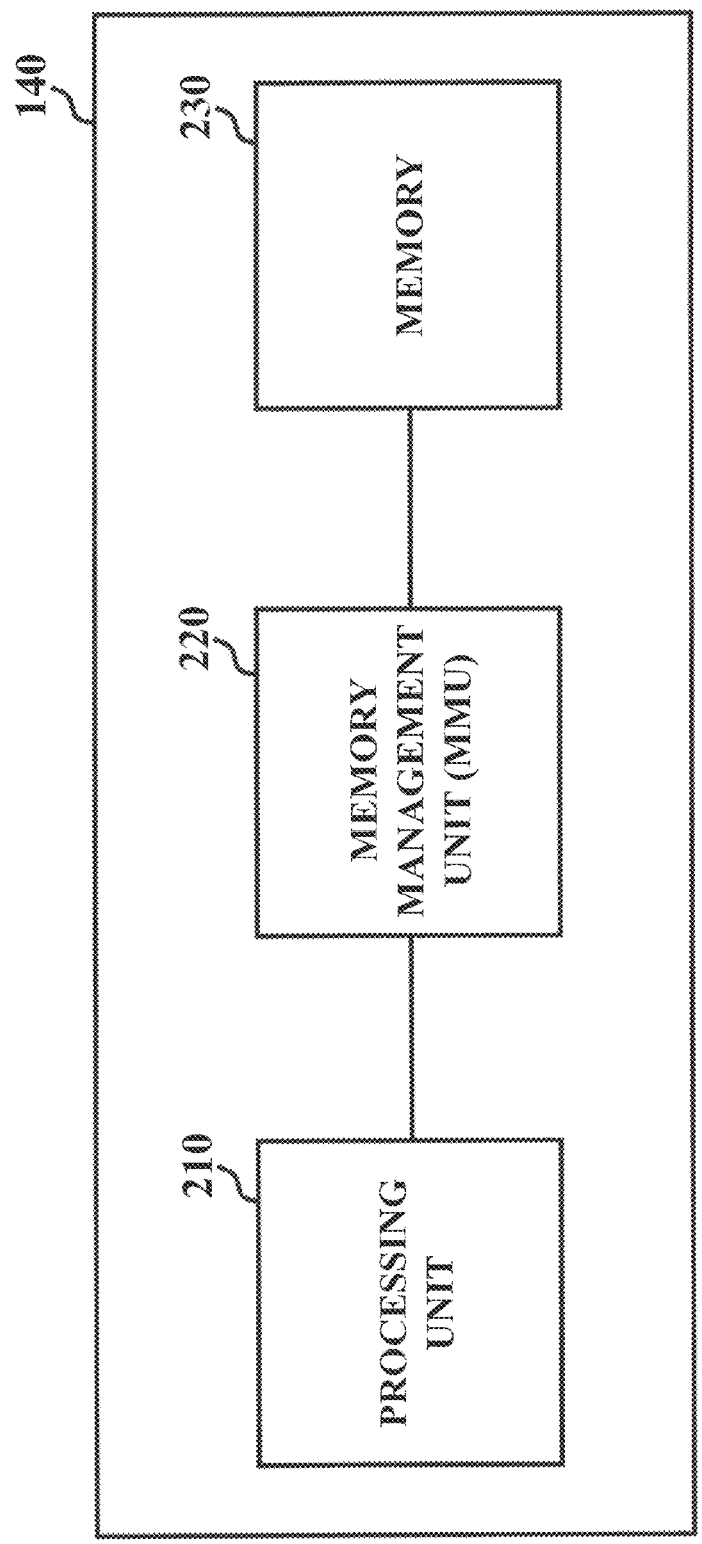
FIG. 2 is a block diagram of a processing module, according to an embodiment.

FIG. 2 is an illustration of an embodiment of processing module 140. Processing module 140 includes a processing unit 210, a memory management unit (MMU) 220, and a memory device 230. Processing unit 210 can be, for example and without limitation, a central processing unit (CPU), a graphics processing unit (GPU), an accelerated processing unit (APU), an application-specific integrated circuit (ASIC) controller, or other similar types or combinations thereof of processing units. Processing unit 210 is configured to execute instructions and to carry out operations associated with graphics processing system 100 of FIG. 1. For instance, graphics processing system 100 can be configured to render and display graphics. MMU 220 is configured to handle accesses to memory device 230 requested by processing unit 210. The functions of MMU 220 include, for example and without limitation, translation of virtual addresses to physical addresses (e.g., virtual memory management), cache control, and bus arbitration. Memory device 230 can be, for example and without limitation, a random access memory device (e.g., Dynamic Random Access Memory, Static Random Access Memory, etc.), a Flash memory device, or other similar types of memory devices.

Figure 3:
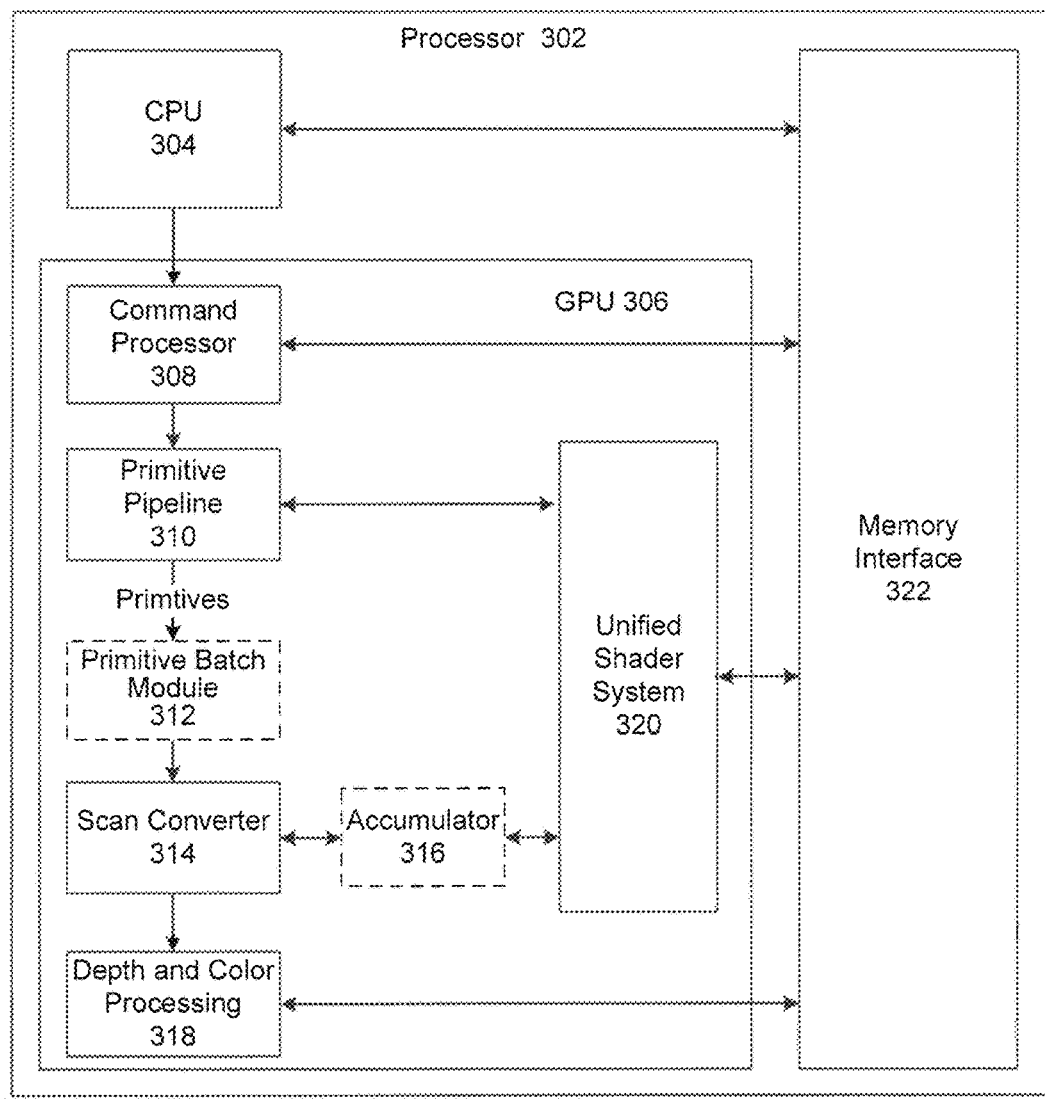
FIG. 3 is a block diagram of an immediate mode rendering system, according to an embodiment.

FIG. 3 illustrates an immediate mode rendering system 300, according to embodiments. Immediate mode rendering system 300 includes a processor 302, a CPU 304 and a GPU 306. To solve the drawbacks of graphics pipelines discussed above, the GPU 306 in the example shown in block diagram 300 includes batch binning module 312 and accumulator 316.

CPU 304 and GPU 306 are communicatively coupled to memory interface 322. In an embodiment, GPU 306 is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

Memory interface 322 provides an interface between CPU 304 and GPU 306 and the Memory Management Unit 220 of FIG. 2 for access to a main memory or private memory, such as random access memory (RAM) (not shown). Memory interface 322 can store, e.g., processing logic instructions, constant values, and variable values during execution of portions of applications or other processing logic. For example, in one embodiment, parts of control logic to perform one or more operations on CPU 304 can reside within memory interface 322 during execution of the respective portions of the operation by CPU 304. The term "processing logic" or "logic," as used herein, refers to control flow commands, commands for performing computations, and commands for associated access to resources.

In an example, memory interface 322 can include command buffers or access to them from main memory (not illustrated) that are used by CPU 304 to send commands to GPU 306 or directly by the GPU 306. Memory interface 322 can also include process lists and process information. The process lists and process information are used by scheduling software executing on CPU 304 to communicate scheduling information to GPU 306 and/or related scheduling hardware.

GPU 306 includes commander processor 308, primitive pipeline 310, primitive batch module 312, scan converter 314, accumulator 316, depth and color processing module 318 and unified shader system 320. Command processor 308 controls the processing within GPU 306. Command processor 308 also retrieves instructions to be executed from command buffers in memory interface 322 and coordinates the execution of those instructions on GPU 306. In one example, CPU 304 inputs commands based on applications 111 (of FIG. 1) into appropriate command buffers of memory interface 322 or sends commands directly to command processor 308. Command processor 308 can be implemented in hardware, firmware, or software, or a combination thereof. In one embodiment, command processor 308 is implemented as a RISC engine with microcode for implementing logic including scheduling logic.

Primitive pipeline 310 generates a sequence of primitives which will be ultimately rendered for display by GPU 306. Primitives include points, lines, polygons or a combination of primitives that are organized into a mesh. A commonly generated primitive is a triangle. The primitive pipeline 310 uses program data and 3D object data to transform geometry from a world coordinate space to screen space. After all surface, geometry, tessellation, clipping, culling, viewport transform and primitive setup processing is completed, a series of primitives in screen space is emitted for rasterization.

Primitive batch module 312 is configured to receive a sequence of primitives from primitive pipeline 310. Upon receipt of a sequence of primitives, primitive batch module 312 is configured to generate a primitive batch, according to an embodiment. A primitive batch is generated by segmenting or capturing a subset of the sequence of primitives. The primitives included in a primitive batch are temporally related, according to an embodiment. Temporally related primitives are segmented into a batch until a predetermined threshold is met. For example, sequential primitives may be captured into a primitive batch until a predetermined condition is met, such as batch full threshold, state storage full threshold, a primitive dependency threshold, or if the incoming primitive is identified as a last primitive. In one example, a primitive batch is formed based on a predetermined maximum batch value. In another example, collapsible batch binning technique may be used, where the maximum amount of collected primitives is fixed, but it is possible to dynamically insert and remove primitives from a batch as needed. According to an embodiment, when a primitive batch is at a maximum capacity, double-buffering of additional sequence of primitives is performed. The double buffering occurs while the primitive batch is processed. In this way primitives may continue to be received and stored while processing is occurring.

According to an embodiment, while a primitive batch is captured, primitive batch module 312 is configured to identify initial bin intercepts for primitives included in the primitive batch. A screen space which displays rendered primitives may be divided into a number of rectangular blocks, such as, a checker board pattern. Each rectangular block of screen space may be associated with a bin. The received sequence of primitives may intersect one or more bins based on the location and size of the primitive. According to an embodiment, an initial bin intercept for a primitive is the upper-most left bin which a primitive intersects. Initial bin intercepts are computed and said information is stored on a per-bin basis. A per bin primitive storage, such as a linked list or scoreboard, is utilized to store information related to the primitive batch. For example, the per bin primitive storage can store information identifying a list of intersecting primitives for each bin. In another example, a special bin processing walk order can be determined and only require the initial bin intercepts to be stored.

According to an embodiment, primitive batch module 312 is configured to identify a bin for processing. A bin can be identified based on the corresponding screen location of primitives included in a primitive batch, according to an embodiment. For example, a bin including primitives associated with the furthest upper left rectangular block region of a screen space can be processed first. Primitive batch module 312 is configured to use the per bin storage to identify a bin to be processed, according to an embodiment. For example, by analyzing the coordinates of all the initial bin intercepts, primitive batch module 312 can determine which bin is the upper-most left bin that includes an intersecting primitive.

Primitive batch module 312 is further configured to process all primitives of the batch intersecting the identified bin. For example, for each primitive intersecting the identified bin, the portion of the primitive which is located within the bin is processed by primitive batch module 312. The processed portion of the primitive is then passed to scan converter 314 for rasterization. Primitive batch module 312 is then further configured to identify next bin intercepts for the processed primitive. A next bin intercept is the next upper-most left bin which the processed primitive intersects, according to an embodiment. Information related to the next bin intercept may be stored in the per bin storage area.

As primitives are received by primitive batch module 312, an arrival identifier is assigned to each primitive. The arrival order determines the order in which primitives of an identified bin are processed. Thus, if primitive batch module 312 identifies multiple intersecting primitives for a particular bin, the primitives included within said bin are processed in an order based on arrival using the assigned arrival identifier. Primitive batch module 312 is configured to iteratively process all the primitives for each of the successive bins including primitives until all primitives of the primitive batch have been completely processed, according to an embodiment.

In one example, scan converter 314 receives primitive and bin location data from primitive batch module 312 for use to determine which pixels are interior to the edges of the passed primitives and bin. Prior to passing the resulting pixels to the accumulator 316, depth and color processing module 318 may perform multiple depth test operations for each pixel or fragment to opportunistically remove hidden fragments that can be determined behind previously rendered objects. The surviving pixels or fragments information is then passed to accumulator 316. In an embodiment, a deferred shading processing operation can be enabled. If deferred shading operation is enabled, pixel shading is delayed until receipt of a complete set of pixels for the identified bin. Based on the received data from scan converter 314, accumulator 316 uses the source pixels x, y, and z coordinate position of each fragment within the bin to determine what needs to be shaded. Additionally, the source position and z coordinates are used by accumulator 316 to determine if earlier received fragments for a given X, Y screen location are further from the eye than the arriving fragment.

Accumulator 312 is then configured to determine contributing and non-contributing fragments within the bin. The depth tests performed by depth and color processing module 318 may remove certain portions of primitives may not factor into the final color or depth tests. Accumulator 312 is configured to further identify fragments which do not contribute to the final color or depth and discard those fragments. In this way, accumulator 316 performs filtering operations to determine which fragments will be shaded. For example, if a fragment is determined to be opaque (i.e. not translucent) and closer to the eye than previously received fragments for a given screen X, Y, then the previous fragment is discarded because the previous fragment will not contribute to the final color. In another embodiment, if the later arriving pixel or fragment in a sequence of primitives passes an early opportunistic hierarchicalZ depth test but is determined using the source Z to be further from the eye than an earlier processed opaque pixel for the same screen XY of the same bin, then the arriving fragment can be discarded prior to pixel shading by accumulator 316. Thus, embodiments create a deferred batch binning processing mechanism which reduces the number of pixel shading operations that are needed.

When accumulator 316 completes its filtering operations for a bin, accumulator 316 organizes the remaining pixels (i.e. contributing fragments) for all pixels of the bin into groups the width of the vector units included in the unified shader system and then transmits the groups to unified shader system 320 for shading operations to be completed.

In one example, unified shader system 320 associates each group of fragments with a particular shader program. Unified shader system 320 can include an array of processing elements capable of performing several different types of shader programs. Unified shader system 320 may execute, for example, a vertex shader, a geometry shader, and a pixel shader—where a pixel shader can execute a user supplied program on a group of pixels assembled and input by the accumulator 316. In addition to the typical graphics-processing tasks (e.g., vertex shaders, geometry shaders, pixel shaders, etc.), unified shader system 302 can perform general-compute operations (e.g., mathematical algorithms, physics simulations, etc.).

One skilled in the relevant arts will appreciate that while embodiments are discussed in reference to a single immediate mode rendering system, embodiments are scalable to include a plurality of immediate mode rendering systems.

Figure 4I:
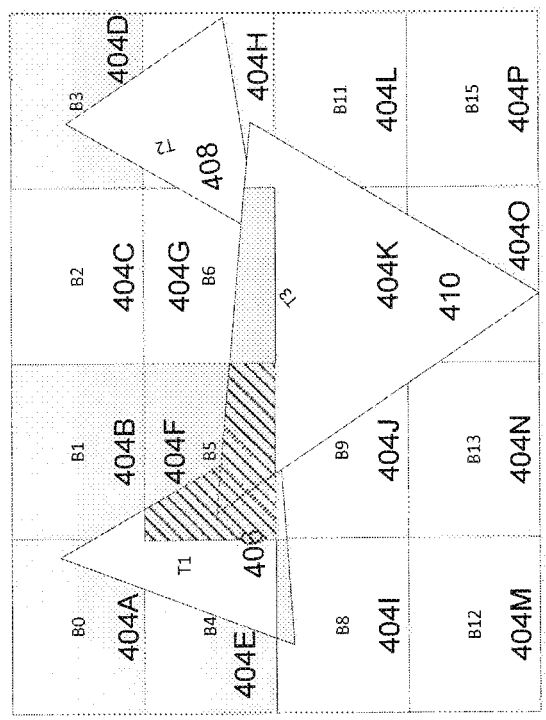

FIGS. 4A-4I illustrate an example of deferred batch binning in an immediate mode rendering system, according to embodiment. FIG. 4A illustrates a screen space area 402, which has been divided into a plurality of rectangular regions or bins 404A-404P. One skilled in the relevant art will appreciate that the divisions illustrated in FIG. 4A is by way of non-limiting examples, and other divisions are contemplated and can be utilized within the scope of the disclosed embodiments.

FIG. 4B illustrates the receipt of a first primitive 406. An initial bin intercept is calculated for first primitive 406. In this example, the initial bin intercept of first primitive 406 is bin 404A. In other words, bin 404A is the upper-most left bin which first primitive 406 intersects. One skilled in the relevant arts will appreciate that other techniques to determine an initial bin intercept can be utilized consistent with this disclosure. However, for the purposes described herein, an upper-most left bin intercept is computed by determining first the upper-most bin row intercepted by the primitive, and then the left-most bin intercepted by the primitive within that row. This arrangement is readily adaptable to other orientations and processing orders.

FIG. 4C illustrates the receipt of a second primitive 408. Similar to first primitive 406 of FIG. 4B, an initial bin intercept of second primitive 408 is computed. In this example, the first bin intercept of second primitive 408 is bin 404D (rather than 404G), since bin 404D is found in the upper-most bin row intercepted by the primitive, and is the left-most bin (in fact, the only bin) intercepted by the primitive within that row.

FIG. 4D illustrates the receipt of a third primitive 410. Similar to first primitive 406 of FIG. 4B and second primitive 408 of FIG. 4C, an initial bin intercept of third primitive 410 is computed. In this example, the first bin intercept of third primitive 410 is bin 404F.

FIG. 4E illustrates the generation of a primitive batch including first primitive 406, second primitive 408 and third primitive 410. As discussed previously, a primitive batch may include primitives based on a predetermined threshold, such as a number of primitives that can be handled based on memory constraints. Additionally, a batch may be generated using a set of received primitives based on a determination that a subsequently received primitive (not illustrated) is dependent upon the processing of at least one of first primitive 406, second primitive 408 and third primitive 410. Such a dependency may affect the final shading of the subsequently received primitive. In such a scenario, the primitive batch would not include the subsequently received primitive. Rather, a new primitive batch is generated for the subsequently receive primitive, which can be processed once the current batch is processed and the dependency is resolved. The new primitive batch is processed at a later time. Returning to FIG. 4E, once the primitive batch is complete, the processing of primitives commences. In this example, processing of primitives will occur on a per-bin basis, starting at bin 404A. At bin 404A, the portion of first primitive 406 intersecting bin 404A is processed and sent for rasterization. While the portion of first primitive 406 is processed, a next bin intercept of first primitive 406 is computed. In this example, the next bin intercept of first primitive 406 is bin 404B. As with computing the initial bin intercept, the next bin intercept is the next upper-most left bin which a primitive intersects.

FIG. 4F illustrates further processing of primitives in the primitive batch. As illustrated, the processing moves in an ordered-manner (i.e. walk order) to the next bin that has a primitive intersect. In this example, the walk order of bins is executed in a left to right manner for each row of bins. However, embodiments are not limited to this ordering scheme. According to an embodiment a walk order and next bin for processing can be dynamic. An orientation of the walk order can include multiple starting direction and starting locations as long as the identified walk order is maintained.

In FIG. 4F, bin 404B is identified for processing and the portion of first primitive 406 which intersects bin 404B is processed and sent for rasterization. The next bin intercept of first primitive 406 is also determined as bin 404E, which is the next upper-most left bin intersected by primitive 406.

FIG. 4G illustrates that the next bin with a primitive intersect is processed. Bin 404C is skipped since it has no intersecting primitives, and the primitive intersecting bin 404D is processed. In this example, the portion of second primitive 408 intersecting bin 404D is processed and sent for rasterization. At the same time, the next bin intercept of second primitive 408 is computed as bin 404G.

FIG. 4H illustrates similar processing as the previous figures, as the portion of first primitive 406 which intersects bin 404E is processed while the next bin intercept of the first primitive 406 is computed as bin 404F.

FIG. 4I illustrates the processing of the primitives intersecting bin 404F. As illustrated, multiple primitives intersect bin 404F (i.e. first primitive 406 and third primitive 410). As discussed previously, each primitive is assigned an arrival identifier in order to maintain the processing sequence of primitives. Thus, in this example, first primitive 406 is processed first followed by third primitive 410. The portion of first primitive 406 intersecting bin 404F is processed and sent for rasterization and a next bin intercept of first primitive 406 is computed as bin 404I. Thereafter, the portion of third primitive 410 intersecting bin 404F is processed and sent for rasterization, while the next bin intercept of third primitive 410 is computed as bin 404G.

It is important to note that FIG. 4I illustrates primitives including portions which overlap. In conventional immediate mode rendering systems, the pixels located in bin 404F and associated with first primitive 406 are shaded even though said pixels are completely covered/occluded by the portions of third primitive 410 in bin 404F. That is because in conventional immediate mode rendering systems, the pixels of third primitive 410 are not known at the time of the rendering of first primitive 406. With embodiments, shading of pixels in a bin can be deferred until all pixels of each primitive of the primitive batch have been rasterized for the identified bin (with HiZ and/or earlyZ testing). With embodiments, pixels are accumulated at a given pixel screen location and through testing and comparison, it can be determined which pixels contribute to a final color or depth. Only contributing pixels are then shaded. Thus unnecessary shading operations are not performed.

Figure 5:
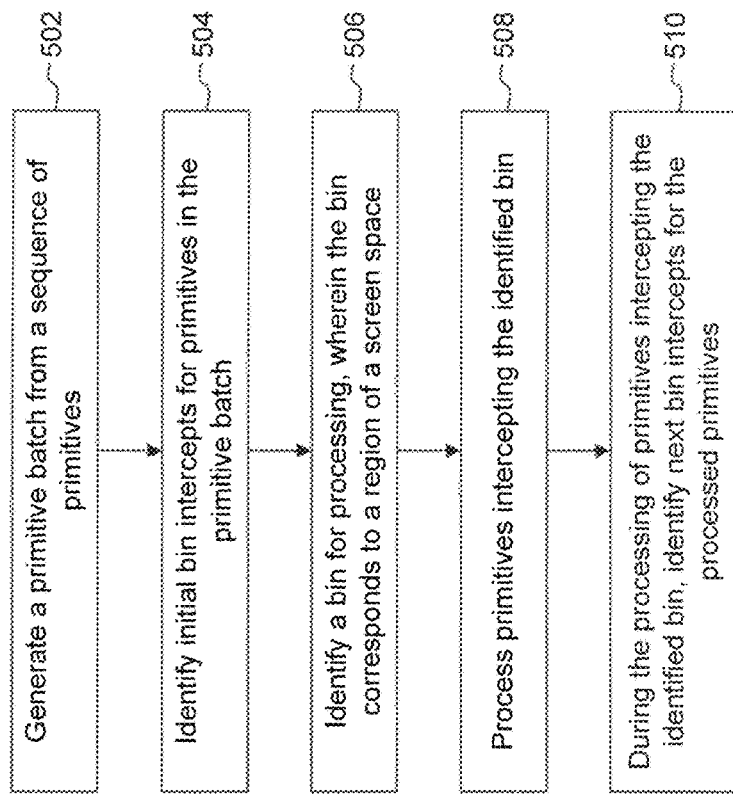
FIG. 5 is a flowchart illustrating a process for deferred primitive batch binning, according to an embodiment.

FIG. 5 is a flowchart illustrating a process for deferred primitive batch binning, according to an example embodiment.

At step 502, a primitive batch may be generated from a sequence of primitives. For example a primitive batch may be generated by primitive batch module 312 of GPU 306. A generated primitive batch includes a subset of the sequence of primitives. The primitives included in a primitive batch are temporally related. Temporally related primitives are segmented into a batch until a predetermined threshold is met. For example, sequential primitives may be captured into a primitive batch until a predetermined condition is met, such as a batch fall threshold, a state storage full threshold, if an incoming primitive is identified as a last primitive, or a primitive dependency threshold.

At step 504, initial bin intercepts are identified for primitives included in the primitive batch. For example, initial bin intercepts may be identified by batch binning module 312 of GPU 306. A bin corresponds to a rectangular boundary region of a screen space. A screen space may be divided into multiple rectangular blocks. Thus, for a given screen space, there can be a plurality of bins. The number of bins may correspond to the number of rectangular boundary regions, according to an embodiment. The primitives included in a primitive batch may intersect one or more bins. An initial bin intercept for a primitive is the upper-most left bin which a primitive intersects. Initial bin intercepts are computed for all primitives in the primitive batch and said information is stored on a per-bin basis.

At step 506, a bin for processing is identified. For example, a bin for processing may be identified by batch binning module 312 of GPU 306. A bin processing order can be pre-determined. For example, the bin processing order can be based on the left-to-right traversal of bins within a screen space region. Thus, in such a scenario, the upper most left bin is processed first followed by the next bin which is adjacent and to the right. The initial bin intercept information that was identified at step 504 may be used in determining a bin to be processed. Based on the initial bin intercepts, the upper-most left bin which includes a primitive is identified as the bin to be processed.

At step 508, primitives intercepting the identified bin are processed. For example, primitives intersecting the identified bin are processed by batch binning module 312 of GPU 306. For each primitive intersecting the identified bin, the portion of the primitive which is located within the bin is processed. The processed portion of the primitive is then transferred for rasterization. When multiple primitives intersect a particular bin, the multiples primitives may be processed during one bin-pass, since all primitives of an identified bin are processed prior to moving on to subsequent bins.

Figure 6:
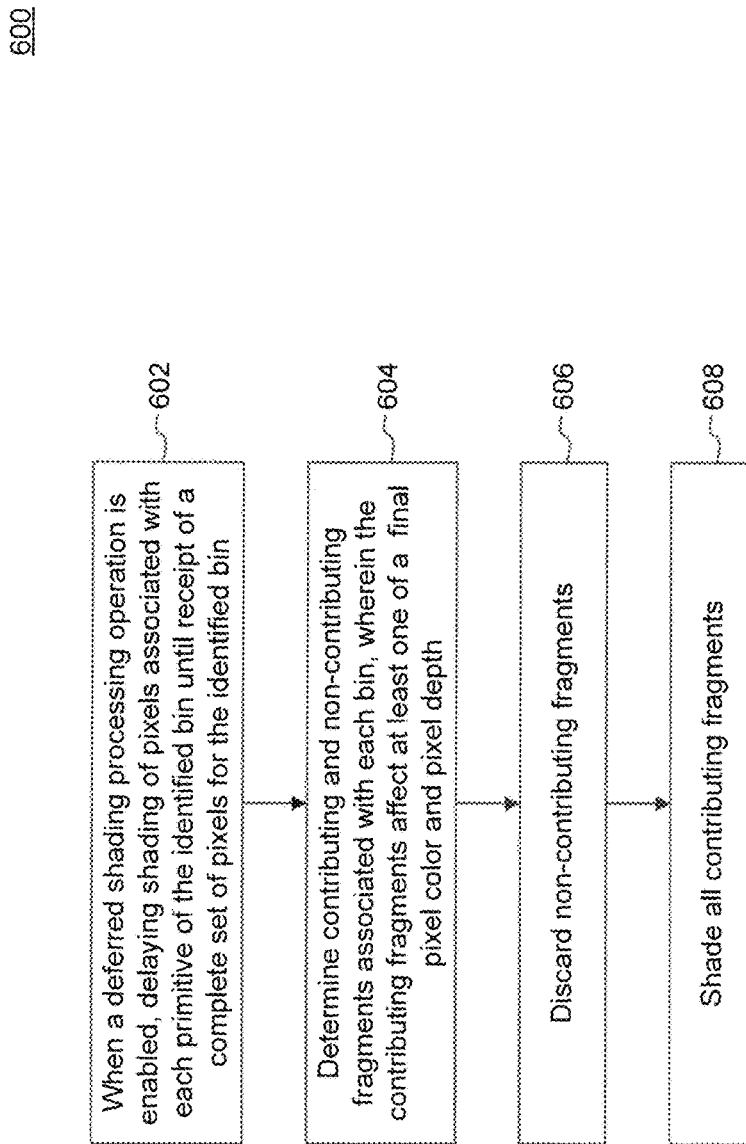
FIG. 6 is flowchart illustrating a delayed shading process, according to an embodiment.

At step 510, a next bin intercept is identified for the processed primitive. For example, step 510 may be performed by batch binning module 312 of GPU 306. A next bin intercept is the next upper-most left bin which the processed primitive intersects, according to an embodiment. Information related to the next bin intercept may also be stored FIG. 6 is a flowchart illustrating a process for deferred shading, according to an example embodiment.

At step 602, shading of pixels associated with each primitive is delayed until receipt of a complete set of pixels for the identified bin. For example, shading of pixels may be delayed by accumulator 216 of processing unit 210. Shading of pixels is delayed when a deferred shading operation is enabled, according to embodiment. A deferred shading operation is a command to halt shading of pixels associated with a primitive.

At step 604, contributing and non-contributing fragments associated with the identified bin are determined. For example, step 604 may be performed by accumulator 216 of processing unit 210. Primitives are rasterized into "pixel fragments". Fragments are subsequently shaded to compute a color to be used for final blending at each pixel of a display. Fragments within the identified bin may overlap. Such overlapping may result in certain fragments not contributing to the final color or depth because these fragments are either completely occluded or the fragments. Such fragments are determined to be non-contributing fragments. Transparent fragments require special handling and may result in the need to shade more than one pixel per screen X, Y for a given bin. One skilled in the relevant art will appreciates the need to shade multiple transparent pixels and one opaque backing primitive. While fragments that factor into the final pixel color or depth are determined to be contributing fragments.

At step 606, non-contributing fragments are discarded. Non-contributing fragments may be discarded by accumulator 216 of processing unit 210. Non-contributing fragments are discarded prior to performing a shading operation. If a fragment is determined to be non-contributing, the fragment is discarded because performing shading operations on such pixels is not necessary and would be an inefficient use of bandwidth and ALU capabilities. In this way embodiments reduce the number of pixel shading operations that are needed.

At step 608, the contributing fragments of the identified bin are shaded.

Embodiments can be accomplished, for example, through the use of general-programming languages (such as C or C++), hardware-description languages (HDL) including Verilog HDL, VHDL, Altera HDL (AHDL) and so on, a programmable shader running as a pre-process to a GPU, or other available programming and/or schematic-capture tools (such as circuit-capture tools). The program code can be disposed in any known computer-readable medium including semiconductor, magnetic disk, or optical disk (such as CD-ROM, DVD-ROM). As such, the code can be transmitted over communication networks including the Internet and internets. It is understood that the functions accomplished and/or structure provided by the systems and techniques described above can be represented in a core (such as a CPU core and/or a GPU core) that is embodied in program code and may be transformed to hardware as part of the production of integrated circuits.

In embodiments, a tangible apparatus or article of manufacture comprising a tangible computer useable or readable medium having control logic (software) stored thereon is also referred to herein as a computer program product or program storage device. This includes, but is not limited to, immediate mode rendering system 300, and memory interface 322 discussed above, as well as tangible articles of manufacture embodying any combination of the foregoing. Such control logic, when executed by one or more data processing devices (such as immediate mode rendering system 300), causes such data processing devices to operate as described herein.

In this document, the terms "computer program medium" and "computer-usable medium" are used to generally refer to media such as a removable storage unit or a hard disk drive. Computer program medium and computer-usable medium can also refer to memories, such as system memory and graphics memory which can be memory semiconductors (e.g., DRAMs, etc.). These computer program products are means for providing software to an APD.

Based on the teachings contained in this disclosure, it will be apparent to persons skilled in the relevant art(s) how to make and use the embodiments using data processing devices, computer systems and/or computer architectures other than that shown in FIG. 7. In particular, embodiments may operate with software, hardware, and/or operating system implementations other than those described herein.

CONCLUSION

It is to be appreciated that the Detailed Description section, and not the Summary and Abstract sections (if any), is intended to be used to interpret the claims. The Summary and Abstract sections (if any) may set forth one or more but not all exemplary embodiments as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

What is claimed is:

1. A method comprising:
   generating a primitive batch from a sequence of primitives, wherein the generated primitive batch includes a subset of the sequence of primitives, wherein each primitive is assigned an arrival identifier;
   identifying an initial bin intercept information for each primitive in the primitive batch, wherein the initial bin intercept information is stored on a per-bin basis;
   identifying a bin for processing the primitive batch using the identified initial bin intercept information for the primitives in the primitive batch, wherein the bin corresponds to a region of a screen space;
   processing at least a portion of at least one primitive intersecting the identified bin, wherein the processing is performed on a per-bin basis and only the portion of the at least one primitive located within the identified bin is processed, wherein the processing of the at least one primitive intersecting the identified bin follows an order of processing associated with the arrival identifier of each primitive, wherein the processing includes a deferred shading processing operation in response to the identified bin having an overlapping region of more than one primitive;
   during the processing of the portion of the primitive intersecting the identified bin, identifying a next bin intercept information for the processed primitive;
   identifying a next bin for processing the primitive batch using the identified initial bin intercept information for the primitives in the primitive batch and the identified next bin intercept information for each processed primitive based on an intercept walk order; and
   iteratively repeating the processing of primitives for successive bins until all primitives of the primitive batch have been completely processed.

2. The method of claim 1, further comprising:
   when the deferred shading processing operation is enabled, delaying shading of pixels associated with each primitive of the identified bin until receipt of a complete set of pixels for the identified bin;
   determining contributing and non-contributing fragments associated with each bin, wherein the contributing fragments affect at least one of a final pixel color and a pixel depth;
   discarding non-contributing fragments; and
   shading all contributing fragments.

3. The method of claim 2, wherein determining contributing and non-contributing fragments comprises:
   identifying an overlapping region for primitives in the identified bin; and
   accumulating contributing pixels in the overlapping region prior to shading; and
   discarding non-contributing pixels.

4. The method of claim 1, wherein the identifying initial bin intercept information comprises:
   determining initial uppermost-left intersection points for primitives in the primitive batch; and
   temporarily storing primitive data including at least the uppermost-left intersection bin.

5. The method of claim 1, wherein identifying a bin to be processed comprises:
   identifying a walk order and next bin for processing; and
   maintaining the identified walk order, wherein an orientation of the walk order includes multiple starting directions and starting locations.

6. The method of claim 1, wherein identifying next bin intercepts comprises:
   determining next uppermost-left intersection points for the processed primitives.

7. The method of claim 1, wherein generating a primitive batch comprises:
   segmenting the sequence of received primitives into a temporally related primitive batch based on a predetermined threshold, wherein the predetermined threshold is based on at least one of a maximum batch value, a state storage full threshold, a primitive dependency and an identification of a last arriving primitive.

8. The method of claim 1, further comprising:
   determining a primitive batch is at a maximum capacity; and
   in response to determining that the primitive batch is at maximum capacity, double-buffering an additional sequence of primitives, wherein the double buffering occurs while the primitive batch is processed.

9. The method of claim 1, wherein generating a primitive batch comprises:
   identifying an appropriate primitive batch for the sequence of primitives; and
   generating a new primitive batch if an appropriate batch is not identified.

10. The method of claim 1, wherein a size of the identified bin is adjustable.

11. The method of claim 1, wherein the walk order is based on the upper-most left bin that includes an intersecting primitive.

12. A system comprising:
   a memory;
   one or more processing units; and
   a bus coupled to the memory and the processing unit;
   wherein the one or more processing units are configured to execute modules comprising a batch binning module configured to:
      generate a primitive batch from a sequence of primitives, wherein the generated primitive batch includes a subset of the sequence of primitives, wherein each primitive is assigned an arrival identifier;
      identify an initial bin intercept information for each primitive in the primitive batch, wherein the initial bin intercept information is stored on a per-bin basis;
      identify a bin for processing the primitive batch using the identified initial bin intercept information for the primitives in the primitive batch, wherein the bin corresponds to a region of a screen space;
      process at least a portion of at least one primitive intersecting the identified bin, wherein the processing is performed on a per-bin basis and only the portion of the at least one primitive located within the identified bin is processed, wherein the processing of the at least one primitive intersecting the identified bin follows an order of processing associated with the arrival identifier of each primitive, wherein the processing includes a deferred shading processing operation in response to the identified bin having an overlapping region of more than one primitive;
      during the processing of the portion of the primitive intersecting the identified bin, identify a next bin intercept information for the processed primitive;
      identify a next bin for processing the primitive batch using the identified initial bin intercept information for the primitives in the primitive batch and the identified next bin intercept information for each processed primitive based on an intercept walk order; and iteratively repeat the processing of primitives for successive bins until all primitives of the primitive batch have been completely processed.

13. The system of claim 12, wherein the processing unit further comprises:
an accumulator module configured to:
when the deferred shading processing operation is enabled, delay shading of pixels associated with each primitive of the identified bin until receipt of a complete set of pixels for the identified bin;
determine contributing and non-contributing fragments associated with each bin, wherein the contributing fragments affect a final pixel color and pixel depth;
discard non-contributing fragments; and
shade all contributing fragments.

14. The system of claim 12, wherein the batch binning module is further configured to:
determine initial uppermost-left intersection points for primitives in the primitive batch; and
temporarily store primitive data including at least the uppermost-left intersection points.

15. The system of claim 12, wherein the batch binning module is further configured to determine next uppermost-left intersection points for the processed primitives.

16. The system of claim 12, wherein the batch binning module is further configured to:
identify an overlapping region for primitives in the identified bin; and
processing pixels in the overlapping region at a same instant of time.

17. The system of claim 12, wherein the batch binning module is further configured to segment the sequence of received primitives into a temporally related primitive batch based on a predetermined threshold, wherein the predetermined threshold is based on at least one of a maximum batch value, a state storage full threshold, a primitive dependency and an identification of a last arriving primitive.

18. The system of claim 12, wherein the walk order is based on the upper-most left bin that includes an intersecting primitive.

19. A non-transitory computer-readable medium having instructions stored thereon, that when executed by a computing device, cause the computing device to perform operations, comprising:
generating a primitive batch from a sequence of primitives, wherein the generated primitive batch includes a subset of the sequence of primitives, wherein each primitive is assigned an arrival identifier;
identifying an initial bin intercept information for each primitive in the primitive batch, wherein the initial bin intercept information is stored on a per-bin basis;
identifying a bin for processing the primitive batch using the identified initial bin intercept information for the primitives in the primitive batch, wherein the bin corresponds to a region of a screen space;
processing at least a portion of at least one primitive intersecting the identified bin, wherein the processing is performed on a per-bin basis and only the portion of the at least one primitive located within the identified bin is processed, wherein the processing of the at least one primitive intersecting the identified bin follows an order of processing associated with the arrival identifier of each primitive, wherein the processing includes a deferred shading processing operation in response to the identified bin having an overlapping region of more than one primitive;
during the processing of the portion of the primitive intersecting the identified bin, identifying a next bin intercept information for the processed primitive;
identifying a next bin for processing the primitive batch using the identified initial bin intercept information for the primitives in the primitive batch and the identified next bin intercept information for each processed primitive based on an intercept walk order; and
iteratively repeating the processing of primitives for successive bins until all primitives of the primitive batch have been completely processed.

20. The computer-readable medium of claim 19, wherein the computing device performs operations, further comprising:
when the deferred shading processing operation is enabled, delaying shading of pixels associated with each primitive of the identified bin until receipt of a complete set of pixels for the identified bin;
determining contributing and non-contributing fragments associated with each bin, wherein the contributing fragments affect at least one of a final pixel color and pixel depth;
discarding non-contributing fragments; and
shading all contributing fragments.

21. The computer-readable medium of claim 19, wherein the computing device performs operations, further comprising:
identifying an overlapping region for primitives in the identified bin; and
processing pixels in the overlapping region at a same instant of time.

22. The computer-readable medium of claim 19, wherein the walk order is based on the upper-most left bin that includes an intersecting primitive.

* * * * *